United States Patent Office 2,816,918
Patented Dec. 17, 1957

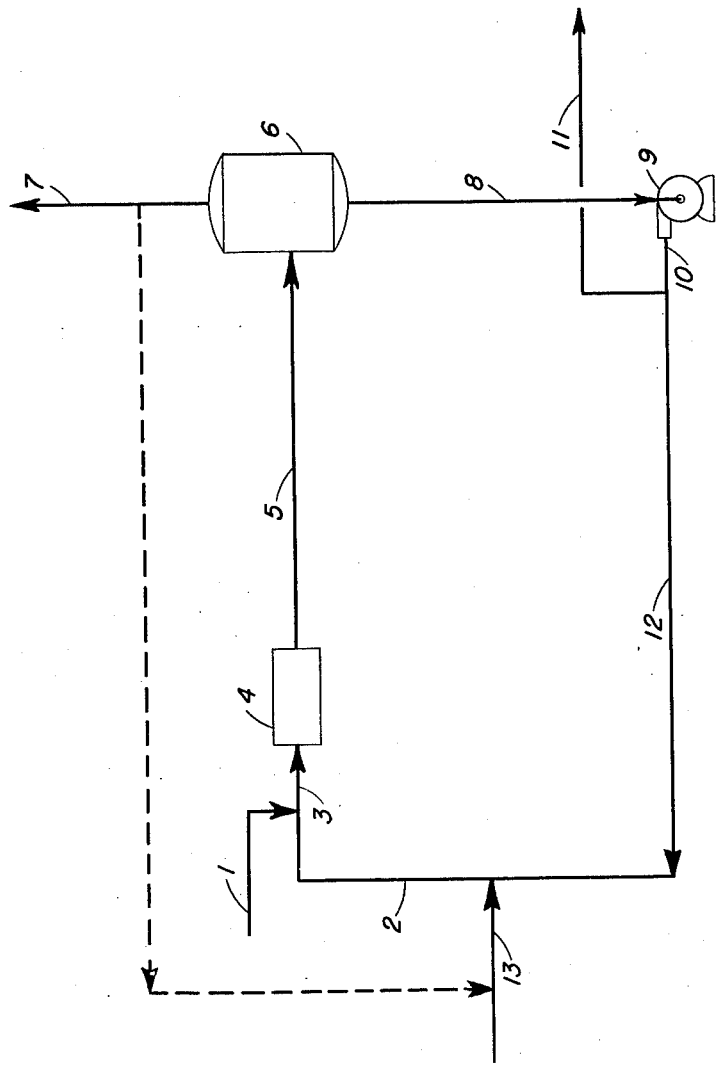

2,816,918

CARBONATION METHOD

Raymond Wynkoop, Metuchen, N. J., John F. Nobis, Cincinnati, Ohio, and John J. Giachetto, La Romana, Dominican Republic, assignors to National Distillers and Chemical Corporation, a corporation of Virginia Application November 23, 1955, Serial No. 548,721

15 Claims. (Cl. 260—533)

The present invention relates to a novel method for carbonation of metallo organic compounds for production of desired metallo salts of carboxylic acids and, more particularly, to a novel method for carbonation of metallo hydrocarbon compounds in a manner whereby to facilitate the carbonation operation and produce desired products in high yields with minimization of undesired side reactions and obtainment of other advantages as are apparent from the description of the invention set forth hereinafter.

In the carbonation of metallo organic compounds for production of metal salts of desired acids, such as for preparation of metal salts of dibasic acids by carbonation of a dimetallo derivative of a hydrocarbon, the carbonation may be carried out by contacting the metallo compound with carbonating mediums such a Dry Ice, gaseous carbon dioxide, and other carbon dioxide-releasing agents. In instances wherein the nature of the metallo compound to be carbonated requires that it be carbonated at a relatively low temperature, carbonation may be suitably carried out by use of Dry Ice, such as by pouring the metallo compounds onto an excess of crushed Dry Ice. However, and although use of Dry Ice as a carbonating medium usually provides satisfactory results, Dry Ice is not only a relatively expensive material for use in relatively large scale operations but, additionally, is difficult to handle in such operations. Thus, and particularly from the viewpoint of economic considerations, ease of handling, and the like, it is particularly desirable to carry out carbonation operations with other carbonating mediums, such as gaseous carbon dioxide. However, in the use thereof in conventional carbonation operations, such as by addition of gaseous carbon dioxide to the material to be carbonated, the temperature employed for the carbonation must be sufficiently low so as to maintain sufficient carbon dioxide in solution to effect the desired carbonation. Obviously, maintenance of the substantially low temperatures required for such carbonation operations involves considerable expense for refrigeration as carbonation reactions are highly exothermic. Nevertheless, particularly from the viewpoint of economic considerations, ease of handling, and the like, it is particularly desirable to use gaseous carbon dioxide for the carbonation operation and, more particularly, if carbonation with gaseous carbon dioxide can be carried out at temperatures higher than are involved in Dry Ice carbonation, which normally are below −60° C. and as low as −78° C., with obtainment of yields of desired products comparable to, or in excess of the yields obtained with Dry Ice carbonation at lower temperatures.

In the conventional use of gaseous carbon dioxide by addition thereof to the material to be carbonated, and in the absence of maintenance of sufficiently low temperatures and high pressures to maintain a substantial excess of $CO_2$ in solution, localized deficiencies of dissolved carbon dioxide tend to occur in the mixture undergoing carbonation whereby undesired side reactions occur that decrease the potential yield of desired products and result in utilization of reactants in production of materials other than the desired products. Accordingly, it is highly desirable to provide a method for carbonation of metallo organic compounds by use of gaseous carbon dioxide under conditions whereby the carbonation may be carried out with yields of desired products comparable to or in excess of the yields obtained from Dry Ice carbonation but at relatively higher temperatures with minimization of undesired side reactions and improved utilization of reactants for formation of desired products. The primary object of this invention is the provision of a method for carbonation with gaseous carbon dioxide whereby such results are obtained along with other advantages as will be apparent from the description of the invention as is set forth hereinafter.

Although the invention embodied herein is contemplated for practice with a wide variety of metallo organic compounds for carbonation thereof, and particularly metallo derivatives of hydrocarbons including aliphatic and aromatic hydrocarbons, it is particularly applicable to carbonation of alkali metal derivatives of hydrocarbons and, more particularly, to dialkali metal derivatives of hydrocarbons such as saturated and unsaturated aliphatic hydrocarbons, aromatic hydrocarbon compounds, and the like. For example, the method embodied herein is particularly applicable to carbonation of dialkali metal derivatives of aliphatic hydrocarbons such as dimers of conjugated diolefins, dimers of vinyl aromatic compounds, and the like, with specific examples being dialkali metal derivatives of dimers of butadiene, dimers of styrene, and the like. Other dialkali metal derivatives contemplated for treatment by the method of this invention include such derivatives of dimers of conjugated diolefins such as dimethylbutadiene, isoprene, the methyl pentadienes, and the like. However, for purposes of illustration and not limitation, the invention is described hereinafter with emphasis on the carbonation of dialkali metal derivatives of dimers of conjugated dienes, such as mixtures of such derivatives prepared by reaction between an alkali metal (e. g., sodium) and butadiene under conditions to selectively dimerize the butadiene and produce high yields of dialkali metal derivatives of dimers of butadiene and from which it is desired, by carbonation, to convert such derivatives to dialkali metal salts of dicarboxylic acids having two more carbon atoms per molecule than the butadiene dimer. In such a specific application, a desired result from carbonation of the mixture resulting from reaction of the alkali metal with butadiene is the ultimate obtainment, as desired products, of dialkali metal salts of $C_{10}$ unsaturated aliphatic acids which, upon further processing including hydrogenation and neutralization, are converted to $C_{10}$ acids including sebacic acid, 2-ethylsuberic acid, and 2,2'-diethyladipic acid.

In accordance with this invention, the metallo organic compound to be carbonated is subjected to carbonation by addition of the metallo organic compound to a carbonating medium comprising gaseous carbon dioxide dissolved in a suitable liquid medium in an amount in excess of the theoretical amount of carbon dioxide required to effect the desired carbonation. More specifically, the metallo organic compound or mixture of such compounds to be carbonated may be subjected to carbonation as embodied herein by use thereof in a relatively low concentration for addition to a relatively high concentration of a suitable inert liquid medium containing dissolved gaseous carbon dioxide, and preferably saturated with carbon dioxide, such that the amount of dissolved carbon dioxide is substantially in excess of that theoretically required to carbonate the metallo organic compound subjected to contact with the inert liquid medium. The carbonation is carried out by addition of the material to be carbonated to the carbonating medium under conditions providing effective distribution of the material to be carbonated in the carbonating medium. The relative proportion of the inert liquid medium utilized for the carbonation may be varied depending upon particular requirements but, in general, the invention is preferably carried out by using a relatively large proportional amount of the liquid medium, e. g., one part by weight of the metallo organic compound to from about 5 to about 60 parts of the inert liquid medium saturated with gaseous carbon dioxide. By practice of the invention embodied herein, wherein carbonation is carried out by addition of the material to be carbonated to an inert liquid medium containing dissolved carbon dioxide, undesired side reactions are suppressed and yields of desired products comparable to, or in excess of, the yields resulting from Dry Ice carbonation may be obtained without need for resort to the extremely low temperatures attendant to Dry Ice carbonation and without encountering the disadvantages resulting from carbonation wherein gaseous carbon dioxide is added to the material to be carbonated and localized deficiencies of carbon dioxide tend to occur.

With reference to the inert liquid medium, it should, in addition to being a solvent for gaseous carbon dioxide, be substantially inert insofar as the carbonation reaction is concerned. Materials contemplated for such usage include ethers, aliphatic hydrocarbons such as propane, tetramers of propylene, aromatic hydrocarbons such as benzene, toluene, and the like. Particularly suitable therefor are ethers such as dimethyl ether and other ethers included in the description set forth hereinafter describing preparation of dialkali metal derivatives of conjugated dienes as specific embodiments of dialkali metal derivatives for carbonation in accordance with this invention. In such instances wherein inert liquids employed in preparation of organic compounds to be carbonated are also solvents for gaseous carbon dioxide, the reaction mixture comprising the inert liquid and the materials to be carbonated may be adjusted, if necessary, with respect to concentration of the inert liquid so as to contain the desired amount of the liquid.

As aforesaid, and in order to illustrate specific aspects of the invention, the invention is described hereinafter with reference to carbonation of a mixture comprising disodio derivatives of dimers of conjugated dienes prepared by metalation reaction under controlled conditions between an alkali metal and a conjugated diene. With respect thereto it has been found that if a finely dispersed alkali metal, such as sodium dispersed in a suitable liquid medium, is used the metalation reaction proceeds selectively to yield more desirable products in high yields. For example, an aliphatic conjugated diolefin, such as butadiene, may be initially treated with finely dispersed sodium in a suitable liquid ether medium to produce a product comprising disodiooctadienes which can be carbonated to produce salts of $C_{10}$ dicarboxylic acids.

In carrying out such metalation reactions, the alkali metal employed for the metalation reaction should be in finely divided form and, generally, in a finely dispersed state in a liquid reaction medium, and the metalation carried out at a temperature below about 0° C., with a temperature in the range of between —20 and —50° C. being preferred. Although either sodium or potassium may be used as the alkali metal reactant, the use of sodium is preferred over potassium since sodium gives excellent selectivities and yields of dimerized products, and it is cheaper and more readily available. Mixtures of sodium and potassium, and of sodium and calcium can also be used. In illustration, a sodium dispersion in which the average particle size is less than 50 microns is quite satisfactory for carrying out the metalation process, the preferred size range being 5 to 15 microns. This dispersion is most conveniently made in an inert hydrocarbon as a separate step preliminary to the selective dimerization reaction with the diene.

The reaction medium found most suitable for use in the metalation reaction consists essentially of an ether and only certain types of ethers are effective. These particular classes of ethers appear to have the common property of serving as promoters of the selective dimerization reaction involved. The ether can be any aliphatic mono ether having a methoxy group, in which the ratio of the number of oxygen atoms to the number of carbon atoms is not less than 1:4. Typical examples include dimethyl ether, methyl ethyl ether, methyl n-propyl ether, methyl isopropyl ether, and mixtures of these methyl ethers. Certain aliphatic polyethers are also quite satisfactory. These include the acyclic and cyclic polyethers which are derived by replacing all of the hydroxyl hydrogen atoms of the appropriate polyhydric alcohol by alkyl groups. Typical examples are the ethylene glycol dialkyl ethers such as the dimethyl, methyl ethyl, diethyl, and methyl butyl ethers. The simple methyl monoethers, as dimethyl ether, and the dimethyl and diethyl ethers of ethylene glycol are preferred. Diethyl ether and hydrocarbon type solvents such as isooctane, kerosene, toluene, and benzene cannot be used exclusively as reaction media since they adversely affect the reaction. The ethers should not contain any groups such as hydroxyl, carboxyl and the like which are distinctly reactive toward sodium. Although the ether may react in some reversible manner, it must not be subject to extensive cleavage, since such cleavage action destroys the ether, uses up sodium and introduces into the reacting system sodium alkoxides which, in turn, tend to induce rubber-forming reactions with the diene rather than promoting the desired dimerization reaction.

Although the reaction medium should consist essentially of the specified ethers, other inert media can be present in limited amounts. In general, these inert media will be introduced with the alkali metal dispersion as the liquid in which the metal is suspended and will act chiefly as diluents. The concentration of ether in the reaction mixture should at all times be maintained at a sufficient level to have a substantial promoting effect upon the desired dimerization reaction.

It is generally desirable to include in the dimerization reaction mixture at least one supplementary activating material, such as for example, a relatively small amount of at least one material of the polycyclic aromatic compound type, inclusive of condensed ring hydrocarbons such as naphthalene and phenanthrene, as well as the uncondensed polycyclic compounds such as diphenyl, the terphenyls, dinaphthyl, tetraphenylethylene, and the like. The polyphenyl compounds such as diphenyl and the terphenyls and their mixtures have been found to be particularly useful. The amount of the hydrocarbon to be used will vary over a range which, in every case, will be relatively small in comparison with the amount of diolefin undergoing reaction. Concentrations in the range of one to ten weight percent, based on the amount of diolefin, of the aromatic compound are ordinarily quite sufficient.

Additionally, it is desirable, in carrying out the reaction between the alkali metal and the material to be dimerized, to utilize a solid friable attrition agent as use thereof generally results in improved utilization of the alkali metal. That is, the use of appropriate sized attrition agent and, preferably, one which is capable of undergoing pulverization under the conditions of the reaction, generally effects a substantial rise in yield of dimerization products based on the alkali metal utilized and at the same time maintains the same high selectively of dimerization and high yields based on the diolefin. Amounts of the attrition agents in the range of 2.5 to 8 parts to one part of solid alkali metal have been found to be generally satisfactory, although smaller and larger amounts are also generally effective. Suitable materials for such usage include inorganic solids such as alkali metal salts from the classes of the halides and sulfates, for example sodium chloride, potassium chloride, sodium sulfate, potassium sulfate, and the like; metallic and nonmetallic oxides which are not reactive with the alkali metal (e. g., sodium) under the conditions of the reactions, such as sand (silicon dioxide), diatoamaceous earth (Cellite), rutile, iron oxide, magnesia and alumina; and other materials such as graphite, zircon and powdered coal.

In one typical method for carrying out such a metalation reaction for preparation of mixtures suitable as starting material for practice of this invention, the sodium or potassium dispersion is initially prepared by placing an inert hydrocarbon such as isooctane in a suitable vessel with the appropriate amount of sodium. The mixture is heated in a surrounding bath or otherwise until the sodium has melted (M. P. 97.5° C.). Then a suitable high speed agitator is started and, preferably, an emulsifier consisting, for example, of ½ percent (based on sodium) of the dimer of linoleic acid is added. After a short period of agitation, a test sample of the dispersion shows the particle size to be in the 5 to 15 micron range. The stirring is then stopped and the dispersion allowed to cool to room temperature whereby the dispersion is now ready to be used in the selective dimerization. Inert liquids such as saturated dibutyl ether, normal octane, n-heptane, or straight run kerosenes, may be employed, as suspension media for the dispersion and other substances may be used instead of the dimeric linoleic acid as dispersing agents.

The dispersion is added to the ether which is precooled to and preferably maintained between $-20°$ to $-50°$ C. The solid attrition agent is then added and the material to be dimerized is introduced slowly. One quite satisfactory method is to introduce this reactant into the reaction vessel at approximately the same rate as that at which it reacts with the sodium. For maximum reaction rate of the dimerization, it is desirable to maintain substantially constant agitation with the reaction mixture.

The dimetallic derivatives of the resulting dimers are rapidly and selectively formed under these conditions. These products, depending on the diolefins, may be either soluble or insoluble in the reaction medium. In general, they tend to form slurries, as for example, the disodiooctadiene product from sodium and butadiene.

These dimetallic derivatives can either be isolated as such, or, since, they tend to be unstable and difficult to handle, they can be directly and immediately thereafter subjected to further reactions to form valuable derivatives. For example, subsequent carbonation at below about 0° C. of the mixture containing the products of the metalation reaction yields the dimetallic salts of the unsaturated dicarboxylic acids containing two more carbon atoms per molecule than the dimetallo dimers from which they are produced. In the case where butadiene is the starting aliphatic diolefin, there results by this method the selective production of $C_{10}$ unsaturated dicarboxylic acids.

The unsaturated diacids or their salts or other derivatives can be hydrogenated at the double bonds to yield the corresponding saturated compounds, particularly the saturated diacids. For example, the disodiooctadiene product obtained from butadiene ultimately gives a practically quantitative yield of a mixture of $C_{10}$ aliphatic diacids, including sebacic acid, 2-ethylsuberic acid, and 2,2'-diethyladipic acid.

In order to illustrate the invention, but without intent of limitation, the following embodiments are set forth for carbonation of reaction mixtures, comprising disodio derivatives of dimers of butadiene, prepared as follows:

An agitated reactor was partially immersed in a solid carbon dioxide-methanol cooling bath sufficient to hold the temperature within the range of $-20°$ to $-30°$ C. A reflux condenser was attached to the reactor and a nitrogen blanket provided throughout the reaction period. Into the reactor, there was placed about 1280 parts by weight of dimethyl ether to which was added 6 parts of para terphenyl. About 138 parts of sodium in the form of a 50% dispersion in refined kerosene was then added, followed by addition of approximately 356 parts of butadiene at a uniform rate over a period of 254 minutes. During this reaction period, the temperature of the reaction mixture was controlled at $-25$ to $-30°$ C. The reaction proceeded rapidly and appeared to be complete almost as soon as the butadiene addition was completed, resulting in a slurry comprising a mixture of disodiooctadienes, dimethyl ether, and kerosene.

The following tabulation (Table I) sets forth data obtained by subjecting the mixture prepared as aforedescribed and comprising disodioctadienes to Dry Ice carbonation by pouring the mixture onto an excess of crushed Dry Ice, and, as embodied herein, by adding the mixture to a solution of gaseous carbon dioxide in dimethyl ether. For the latter, the defined solution of carbon dioxide in dimethyl ether (one liter) was maintained at the pressures and temperatures shown in the tabulation for each example, the addition of the mixture comprising disodiooctadienes being made at a rate of 120 cc. at three minute intervals until a total of 840 cc. of the mixture was added. In the period in between each addition of the mixture, the resulting mixture was subjected to vigorous stirring.

*Table I*

| Run No. | Type of CO₂ | Pressure (p.s.i.g.) | Temp., °C. | Mol percent of CO₂ in dimethyl ether | Yields, percent by weight* | | | Neutralization equivalent of $C_{10}$ fraction | Percent $C_{10}$** fraction neutralization equivalent |
|---|---|---|---|---|---|---|---|---|---|
| | | | | | Low boiling fraction | $C_{10}$ fraction | Residue | | |
| 1 | Dry Ice | | | | 0.6 | 96 | 3.7 | 108.5 | 88.5 |
| 1 | Gaseous | 60 | −20 | 25.8 | 4.9 | 90.5 | 4.6 | 100.8 | 90.0 |
| 2 | Dry Ice | | | | 19.8 | 72.4 | 7.8 | 103.7 | 69.8 |
| 2 | Gaseous | 60 | −20 | 25.8 | 18.8 | 75.0 | 6.0 | 100.0 | 75.0 |
| 2 | do | 40 | −20 | 16.3 | 23.2 | 69.0 | 7.8 | 103.1 | 67.0 |
| 3 | Dry Ice | | | | 17.9 | 75.7 | 6.4 | 103.7 | 73.0 |
| 3 | Gaseous | 30 | −20 | 12.2 | 18.2 | 73.9 | 7.9 | 100.3 | 73.6 |
| 4 | Dry Ice | | | | 4.7 | 88.9 | 6.4 | 102.9 | 86.4 |
| 4 | Gaseous | 20 | −40 | 20.0 | 6.0 | 91.4 | 2.6 | 101.8 | 89.8 |
| 4 | do | 20 | −30 | 12.8 | 6.3 | 91.0 | 2.7 | 106.4 | 85.4 |
| 5 | Dry Ice | | | | 5.4 | 90.0 | 4.6 | 100.8 | 89.5 |
| 5 | Gaseous | 10 | −60 | 32 | 5.9 | 91.1 | 3.0 | 100.3 | 90.8 |
| 5 | do | 20 | −60 | 45 | 5.6 | 91.6 | 2.8 | 100.8 | 90.9 |

*(Produced by flash distillation at 1-2 mm. to remove a low boiling fraction up to 180° C.–190° C.; a $C_{10}$ fraction at 190–215° C.; and a residue.)
**Values shown are for the percent by weight of $C_{10}$ fraction yield divided by the neutralization equivalent (99) of the $C_{10}$ unsaturated acids.

As is apparent from the foregoing data in the tabulation, carbonation of the mixture comprising disodiooctadienes by addition of the mixture to a relatively large volume of dimethyl ether containing dissolved gaseous carbon dioxide in the amounts shown can be carried out at temperatures higher than those attendant to Dry Ice carbonation (e. g., −60° C. and lower) with obtainment of yields of desired $C_{10}$ diacid fractions substantially similar to or in excess of those resulting from Dry Ice carbonation. For example, and as also shown by the data, a concentration of 20 or more mol percent of gaseous $CO_2$ dissolved in the dimethyl ether resulted in higher yields of $C_{10}$ fractions at temperatures as high as −20° C. whereas concentrations of less than about 20 mole percent in the dimethyl ether resulted in yields comparable to those from Dry Ice carbonation in most instances (percent $CO_2$ in dimethyl ether with Dry Ice as source of $CO_2$ at −60° C. is about 20%). Thus, and for a method of carbonation as utilized for obtainment of the foregoing data, a preferred aspect is the use of a suitable inert liquid containing in solution about 20 or more mole percent of gaseous carbon dioxide, the amount of liquid employed being such that the total amount of carbon dioxide is substantially in excess of that theoretically required to carbonate the metal derivatives of the hydrocarbon in the mixture subjected to carbonation.

Whereas, as shown by the foregoing data in Table I, results comparable to those obtained by Dry Ice carbonation were obtained by practice of this invention, the following tabulation (Table II) illustrates results, as compared to those from Dry Ice carbonation, typical of those obtained by conventional carbonations, wherein gaseous carbon dioxide is added to the material to be carbonated in amount sufficient to saturate the material as distinguished from the method herein wherein the material to be carbonated is added to a suitable inert liquid containing dissolved gaseous carbon dioxide. As shown in Table II, the conventional carbonations with gaseous carbon dioxide produced lower yields of desired $C_{10}$ diacid fractions from mixtures comprising disodiooctadienes and increased yields of low boiling fractions and residues.

*Table II*

| Run No. | Type of $CO_2$ | Temperature* | Yields (by weight) | | | Neutralization equivalent of $C_{10}$ fraction |
|---|---|---|---|---|---|---|
| | | | Low boiling fraction | $C_{10}$ fraction | Residue | |
| 1 | Dry Ice | | 1.7 | 85.7 | 11.5 | 102.5 |
| 1a | Gaseous | Below −41° F | 7.9 | 76.0 | 14.6 | 102.5 |
| 2 | Dry Ice | | 3.9 | 87.4 | 8.2 | 101.5 |
| 2a | Gaseous | Below −43° F | 5.4 | 66.5 | 25.2 | 102.3 |
| 3 | Dry Ice | | 1.7 | 90.4 | 6.4 | 99.7 |
| 3a | Gaseous | Below −30° F | 8.9 | 73.5 | 13.8 | 104.4 |

*Atmospheric pressure.

In another embodiment, and to illustrate a particularly preferred method for carrying out the invention in a continuous manner, reference is made to the accompanying drawing wherein there is shown line 1 for introduction of material to be carbonated, line 2 for recycled material saturated with gaseous $CO_2$ for admixture with material from line 1 to provide a mixture for passage via line 3 through heat exchanger 4 whereby the mixture is maintained at carbonating temperature and carbonation is effected to provide a carbonated mixture for passage through line 5 to reservoir 6. Reservoir 6 is provided, as shown, with vent 7 for withdrawal of gaseous material (i. e., gaseous $CO_2$) therefrom, and outlet line 8 for withdrawal of carbonated material from reservoir 6 to pump 9. From pump 9, the carbonated material passing through line 10 is partly withdrawn through line 11 and the remainder is passed through line 12 of which line 2 is a continuation. Prior to the junction of line 2 with line 1, an inlet 13 is provided for introduction of gaseous carbon dioxide into the material to be passed through line 2 for admixture with material introduced via line 1. If desired, gaseous carbon dioxide for introduction via line 13 may be obtained by recycling $CO_2$ vented via line 7 and the line (shown dotted) in the drawing.

In practice of the invention in accordance with an embodiment as shown in the drawing, a reaction mixture comprising disodiooctadienes, prepared as aforedescribed and containing in weight ratio about 3.3 parts of disodiooctadienes, 36 parts of dimethyl ether and about 3–4 parts of kerosene, is introduced into line 1, at a rate such that, correlated with material withdrawn via line 11 and material recycled via lines 12 and 2, a recycle ratio of about 30 to 1 was provided. Gaseous $CO_2$ is introduced via line 13 in an amount sufficient to saturate the dimethyl ether in the material passing through lines 12 and 2, whereby the material to be carbonated and introduced through line 1 contacts a relatively larger amount of material saturated with gaseous $CO_2$ passing through line 2.

In the following tabulation (Table III) data are set forth on results obtained by use of a process as illustrated in the drawing under conditions whereby a recycle ratio of 30:1 was employed, the high rate of recycle being such that a high degree of mixing occurred to provide effective distribution of a relatively small concentration of material to be carbonated in a relatively large volume of dimethyl ether saturated with gaseous carbon dioxide. For comparison purposes, data are also shown for comparable runs made by carbonation of a material such as that introduced via line 1 by Dry Ice rather than by the aforedescribed embodiment.

*Table III*

| Run No. | Temperature, °F. | Type of $CO_2$ | Yield | | | Neutralization equivalent of $C_{10}$ fraction |
|---|---|---|---|---|---|---|
| | | | Low boiling fraction | $C_{10}$ fraction | Residue | |
| 1 | −37 | Dry Ice | 10.8 | 80.7 | 5.5 | 102.1 |
| 1 | | Gaseous $CO_2$ dissolved in dimethyl ether. | 8.0 | 82.5 | 5.5 | 101.7 |
| 2 | −29 | Dry Ice | 3.6 | 91.5 | 1.7 | 100.0 |
| 2 | | Gaseous $CO_2$ dissolved in dimethyl ether. | 4.5 | 89.5 | 4.5 | 100.9 |
| 3 | −36 | Dry Ice | 6.5 | 78.9 | 9.3 | 98.6 |
| 3 | | Gaseous $CO_2$ dissolved in dimethyl ether. | 6.9 | 79.8 | 5.5 | 98.1 |
| 4 | −29 | Dry Ice | 6.0 | 81.5 | 6.1 | 101.0 |
| 4 | | Gaseous $CO_2$ dissolved in dimethyl ether. | 4.1 | 80.6 | 12.8 | 100.8 |

As is apparent from the foregoing data obtained by practice of the invention, carbonation of the metallo hydrocarbon compounds may be carried out by addition thereof to an inert liquid saturated with gaseous $CO_2$, under conditions to effect a high degree of distribution of the material to be carbonated in a relatively large concentration of the inert liquid, whereby desired acids are produced that in yields and quality are at least comparable to, and in many instances improvements over, the results obtained from Dry Ice carbonation at substantially lower temperatures.

While there are above disclosed but a limited number of embodiments of the invention herein presented, it is possible to produce still other embodiments without departing from the inventive concept herein disclosed, and it is desired therefore that only such limitations be imposed on the appended claims as are stated therein.

What is claimed is:

1. In a process for preparation of alkali metal salts of carboxylic acids by reacting an alkali metal with an olefin from the group consisting of conjugated dienes and vinyl aromatic hydrocarbons to prepare a metalation reaction mixture containing alkali metal derivatives of said olefin including dialkali metal derivatives of dimers of said olefin, and carbonating said alkali metal derivatives for conversion thereof to alkali metal salts of carboxylic acids including dialkali metal salts of dicarboxylic acids having two more carbon atoms per molecule than the dimer of said olefin, the improvement which comprises carbonating said alkali metal derivatives by adding said derivatives to a solution of carbon dioxide in an inert liquid solvent for carbon dioxide, said carbonation being carried out by effectively distributing said derivatives in a substantially larger amount by weight of said solution containing an amount of carbon dioxide in excess of the amount theoretically required to carbonate said derivatives.

2. A process, as defined in claim 1, wherein the alkali metal derivatives are added to said inert liquid in an amount of one part by weight of said derivatives to from about 5 to about 50 parts of said inert liquid saturated with carbon dioxide.

3. A process, as defined in claim 1, wherein the inert liquid contains at least 20 mol percent of carbon dioxide in solution.

4. In a process for preparation of sodium salts of $C_{10}$ unsaturated aliphatic dicarboxylic acids by reacting finely divided sodium with butadiene at a temperature below about 0° C. to prepare a metalation reaction mixture comprising sodium derivatives of butadiene including disodio derivatives of octadienes, and carbonating said sodium derivatives to sodium salts of carboxylic acids including disodio salts of aliphatic $C_{10}$ diacids, the improvement which comprises carrying out said carbonation by adding said derivatives to a solution of carbon dioxide in an inert liquid solvent for carbon dioxide, said carbonation being carried out by effectively mixing said derivatives in a substantially larger amount by weight of said solution saturated with carbon dioxide and containing in solution an amount of carbon dioxide in excess of the amount theoretically required to carbonate said derivatives.

5. A method, as defined in claim 4, wherein the reaction between sodium and butadiene is carried out in presence of an ether from the group consisting of aliphatic monoethers having a methoxy group and an oxygen to carbon ratio of not less than 1:4 and polyethers derived from an aliphatic polyhydric alcohol having all the hydroxyl hydrogen atoms replaced by alkyl groups and mixtures thereof.

6. A method, as defined in claim 4, wherein the reaction between butadiene and sodium is carried out in presence of a polycyclic aromatic hydrocarbon.

7. A method, as defined in claim 4, wherein the reaction between butadiene and sodium in carried out in presence of a solid, friable attrition agent.

8. A process, as defined in claim 4, wherein the reaction between sodium and butadiene is carried out in presence of an ether from the group consisting of aliphatic monoethers having a methoxy group and an oxygen to carbon ratio of not less than 1:4 and polyethers derived from an aliphatic polyhydric alcohol having all the hydroxyl hydrogen atoms replaced by alkyl groups and mixtures thereof, a small amount of a polycyclic aromatic hydrocarbon, and a solid, friable attrition agent.

9. A continuous process for carbonating metalation reaction mixtures comprising alkali metal derivatives of an olefinic hydrocarbon from the group consisting of conjugated dienes and vinyl aromatic hydrocarbons, said reaction mixture being further characterized by containing dialkali metal derivatives of dimers of said olefinic hydrocarbon and a liquid that is a solvent for carbon dioxide and inert to the carbonation reaction whereby to convert said derivatives to salts of carboxylic acids, which comprises continuously introducing into and effectively distributing said metalation reaction mixture in a recycle stream containing dissolved carbon dioxide to produce a carbonated mixture comprising said salts and said liquid solvent for carbon dioxide, continuously withdrawing from the process a minor portion of said carbonated mixture, continuously dissolving carbon dioxide in the remainder of said carbonated mixture, and recycling said portion of said carbonated mixture in which carbon dioxide has been dissolved for use as the recycle stream into which the metalation reaction mixture is introduced, said recycle stream to which the metalation reaction mixture is added being characterized by containing dissolved carbon dioxide in an amount in excess of the amount of carbon dioxide theoretically sufficient to carbonate the alkali metal derivatives in the reaction mixture added to said recycle stream.

10. A process, as defined in claim 9, wherein the metalation reaction mixture is prepared by reaction of finely divided sodium with a conjugated diolefin to provide a metalation reaction mixture comprising sodium derivatives of said diolefin including disodio derivatives of dimers of said diolefin.

11. A continuous process for carbonating a metalation reaction mixture comprising alkali metal derivatives of butadiene including dialkali metal octadienes and a liquid that is a solvent for carbon dioxide and inert to the carbonation reaction to convert said derivatives to salts of carboxylic acids including dialkali metal salts of $C_{10}$ unsaturated aliphatic acids which comprises continuously introducing into and mixing said metalation reaction mixture in a recycle stream saturated with carbon dioxide to produce a carbonated mixture comprising said salts and said liquid solvent for carbon dioxide, continuously withdrawing from the process a portion minor of said carbonated mixture, saturating the remainder of said carbonated mixture with carbon dioxide, and continuously recycling said carbonated mixture saturated with carbon dioxide as the recycle stream into which the metalation reaction mixture is introduced, said recycle stream to which the metalation reaction mixture is added being characterized by containing dissolved carbon dioxide in an amount in excess of the amount of carbon dioxide theoretically sufficient to carbonate the alkali metal derivatives in the metalation reaction mixture added to said recycle stream.

12. A process, as defined in claim 11, wherein the alkali metal is sodium and the carbonation reaction is carried out at a temperature of below about 0° C.

13. A process, as defined in claim 11, wherein the liquid solvent for carbon dioxide is an ether from the group consisting of aliphatic monoethers having a methoxy group and an oxygen to carbon ratio of not less than 1:4 and polyethers derived from an aliphatic polyhydric alcohol having all the hydroxyl hydrogen atoms replaced by alkyl groups and mixtures thereof.

14. A process, as defined in claim 13, wherein the liquid solvent is dimethyl ether.

15. A process, as defined in claim 4, wherein the carbonation is carried out by effectively distributing the sodium derivatives in amount of from about one part by weight in from about 5 to about 50 parts by weight of said inert liquid medium saturated with carbon dioxide and containing in solution an amount of carbon dioxide in excess of the amount theoretically required to carbonate said derivatives.

References Cited in the file of this patent

UNITED STATES PATENTS

| | | |
|---|---|---|
| 2,352,461 | Walker | June 27, 1944 |
| 2,716,662 | Cohen et al. | Aug. 30, 1955 |
| 2,749,364 | Greenberg | June 5, 1956 |

FOREIGN PATENTS

| | | |
|---|---|---|
| 1,093,096 | France | Nov. 17, 1954 |

U. S. DEPARTMENT OF COMMERCE
PATENT OFFICE

CERTIFICATE OF CORRECTION

Patent No. 2,816,918                                December 17, 1957

Raymond Wynkoop et al.

It is hereby certified that error appears in the printed specification of the above numbered patent requiring correction and that the said Letters Patent should read as corrected below.

Column 3, line 9, for "about 60 parts" read --about 50 parts--.

Signed and sealed this 25th day of February 1958.

(SEAL)
Attest:
KARL H. AXLINE
Attesting Officer

ROBERT C. WATSON
Commissioner of Patents